United States Patent
Ratert et al.

(10) Patent No.: US 7,603,107 B2
(45) Date of Patent: Oct. 13, 2009

(54) RADIO TELEPHONE SYSTEM ALLOWING EXCHANGE OF CALL SETUP PARAMETERS BETWEEN ASSOCIATED OR COMMONLY OWNED MOBILE DEVICES

(75) Inventors: Matthias Ratert, Bochum (DE); Miska Jyri Juhana Hiltunen, Witten (DE)

(73) Assignee: Nokia Corporation, Espoo (FI)

( * ) Notice: Subject to any disclaimer, the term of this patent is extended or adjusted under 35 U.S.C. 154(b) by 620 days.

(21) Appl. No.: 10/476,167

(22) PCT Filed: Apr. 29, 2002

(86) PCT No.: PCT/IB02/01533

§ 371 (c)(1),
(2), (4) Date: Mar. 18, 2004

(87) PCT Pub. No.: WO02/089449

PCT Pub. Date: Nov. 7, 2002

(65) Prior Publication Data

US 2004/0142684 A1 Jul. 22, 2004

(30) Foreign Application Priority Data

Apr. 30, 2001 (GB) .................................. 0110528.7

(51) Int. Cl.
*H04W 4/00* (2006.01)
(52) U.S. Cl. .................. 455/414.1; 455/403; 455/422.1
(58) Field of Classification Search ................ 455/420, 455/502, 550.1, 11.1, 41.2, 411, 431, 569.1, 455/414.1, 410, 403, 422.1, 432.3
See application file for complete search history.

(56) References Cited

U.S. PATENT DOCUMENTS

| | | | | |
|---|---|---|---|---|
| 5,715,522 A | * | 2/1998 | Vimpari et al. ................. | 455/88 |
| 5,748,621 A | * | 5/1998 | Masuda et al. ............... | 370/337 |
| 5,781,860 A | * | 7/1998 | Lopponen et al. ......... | 455/426.1 |
| 5,839,051 A | * | 11/1998 | Grimmett et al. ........... | 455/551 |
| 6,041,229 A | | 3/2000 | Turner ......................... | 455/420 |
| 6,097,967 A | | 8/2000 | Hubbe et al. ................. | 455/558 |
| 6,658,249 B1 | * | 12/2003 | Hietalahti et al. ......... | 455/422.1 |
| 6,859,650 B1 | * | 2/2005 | Ritter ......................... | 455/406 |
| 6,928,299 B1 | * | 8/2005 | Rinne et al. .................. | 455/555 |
| 2003/0144003 A1 | * | 7/2003 | Ranta et al. .................. | 455/450 |
| 2004/0033795 A1 | * | 2/2004 | Walsh et al. ............. | 455/404.1 |

FOREIGN PATENT DOCUMENTS

| | | |
|---|---|---|
| DE | 10012057 A1 | 9/2001 |
| EP | 0378450 A2 | 7/1990 |
| EP | 0-468 790 A2 | 1/1992 |

(Continued)

*Primary Examiner*—Charles N Appiah
*Assistant Examiner*—Jaime M Holliday
(74) *Attorney, Agent, or Firm*—Harrington & Smith, PC

(57) ABSTRACT

A communication system includes first and second radiotelephones capable of communicating with a telecommunications network. The second radiotelephone is capable of remotely acquiring at least some of the identification information of the first radiotelephone and is further capable of acquiring connection parameters from the first radiotelephone. The communication parameters may include information relating to any of: the strongest radio channel; available frequency bands; and radio channels in use. The acquired parameters are applied to effect a connection to the network, without going through channel searching procedures. This overcomes the need to physically transfer subscriber identification modules (SIMs).

29 Claims, 4 Drawing Sheets

INVENTION; FIRST EMBODIMENT

FOREIGN PATENT DOCUMENTS

| | | |
|---|---|---|
| GB | 2270442 A | 3/1994 |
| GB | 2 292 046 A | 2/1996 |
| GB | 2 294 787 A | 5/1996 |
| GB | 2 315 390 A | 1/1998 |
| JP | 11-154918 | 6/1999 |
| JP | 11154918 A * | 6/1999 |

* cited by examiner

INVENTION; FIRST EMBODIMENT

INVENTION; SECOND EMBODIMENT

RADIO TELEPHONE SYSTEM ALLOWING EXCHANGE OF CALL SETUP PARAMETERS BETWEEN ASSOCIATED OR COMMONLY OWNED MOBILE DEVICES

FIELD OF THE INVENTION

The present invention relates to mobile communications, and particularly to portable radio telephones.

BACKGROUND OF THE INVENTION

In a typical radiotelephone system, such as GSM, each radiotelephone or cellular device requires a subscriber identification module (SIM) in order to communicate with a telecommunications network. The SIM contains details such as the subscriber number (telephone number), phonebook information, and security information for validating and providing secure access to the telecommunications network. Generally the SIMs are removable from a radiotelephone and may placed in another radiotelephone, which thereby connects to the network using information contained in the SIM. For security reasons each SIM is unique and duplicate SIM's cannot be used in, for example, separate cellular devices. This, however, can prove extremely inconvenient for the user having two or more radiotelephones.

Other radiotelephone standards do not use subscriber identification modules but have a number assignment module (NAM) or other similar device for storing identification information. A NAM typically provides information similar to that provided by a SIM, but in a non-removable format, such as in a protected area of memory with a radiotelephone. Additionally, a NAM may also include information relating to the radiotelephone itself, such as a unique radiotelephone identifier.

Consider the case where a user has, for example a hand portable radiotelephone for normal use, and a car radiotelephone for use whilst driving. The user would need one SIM for each radiotelephone, although only one radiotelephone would be operated at any one time. This also creates additional problems, for example, as the user has two different subscriber numbers. This means that anyone trying to contact the user would need to try perhaps both subscriber numbers depending on whether the user is using the hand portable or car radiotelephone.

One way around this problem is for the user to have just one SIM, and to physically transfer the SIM to whichever radiotelephone is currently in use. This, however, is cumbersome since first the power must be switched off, the SIM must be removed, the SIM inserted into the new device, the new device must be powered on, and finally the new device must go through the initialization and network authorization phases. During this time no calls can be made or received. This process is further hindered by the fact that in many radiotelephones the SIM is located behind the battery, so that the additional steps of removing and replacing the battery must be performed.

Various methods are known whereby SIM information in one radiotelephone may be read or accessed by another radiotelephone, for example, as described in European Patent 0 378 450. Such systems allow a single SIM to be shared (although not simultaneously) among multiple radiotelephones. However, such systems still require a lengthy transfer procedure, i.e. the time taken for a radiotelephone to be fully operational after having accessed the SIM information from another radiotelephone.

SUMMARY OF THE INVENTION

Accordingly, one aim of the present invention is to overcome the above-mentioned problems.

According to a first aspect of the present invention there is provided a communication system comprising first and second communication devices capable of communicating with a telecommunications network, the first communication device comprising identification information, the second communication device being capable of remotely acquiring at least some of the identification information of the first communication device, wherein the second communication device is further capable of acquiring connection parameters from the first communication device and applying the acquired parameters to effect a connection to the network.

According to a second aspect of the present invention there is provided a method of connecting a first communication device to a network using information contained in a second communication device already connected to the network, comprising: acquiring, at the first communication device at least some of the information contained in the second communication device; further acquiring, at the first communication device, connection parameters stored in the second communication device; using the acquired parameters to connect the first communication device to the network.

One advantage of the present invention is that the management of multiple radiotelephones is facilitated. Furthermore, the present invention advantageously provides a mechanism which allows the exchange of the. responsibility from one cellular system to another. Further advantages provided by the present invention include improvements in the amount of time needed to perform such responsibility exchange. The present invention also allows the hand-over from one radiotelephone to another during use.

BRIEF DESCRIPTION OF THE DRAWINGS

The invention will now be described, by way of example only, with reference to the accompanying drawings, in which.

DETAILED DESCRIPTION OF THE INVENTION

Figure 1:
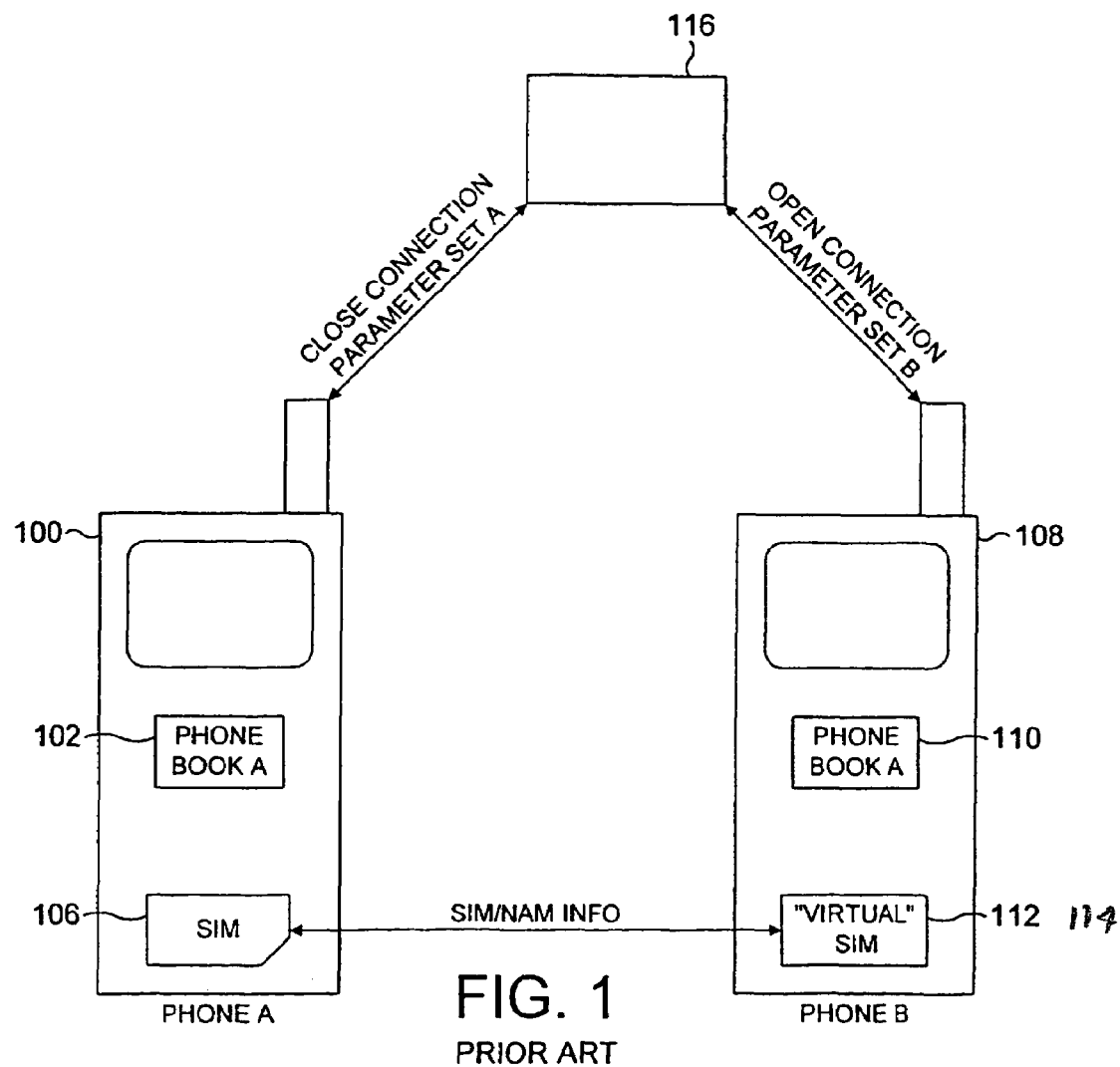
FIG. 1 is a block diagram of a system according to the prior art.

FIG. 1 is a block diagram of a system according to the prior art. A pair of radiotelephones 100 and 108 are shown. Both radiotelephones 100 and 108 are capable of communication with a telecommunications network 116. radiotelephone 100 comprises a phonebook 102, and a subscriber identification module (SIM) 106. The radiotelephone 108 also comprises a phonebook 110, and a virtual SIM 114. Although radiotelephone 108 does not have its own SIM, it is capable of accessing information in the SIM 106 of radiotelephone 100. In this way, radiotelephone 108 can acquire information contained in the SIM of radiotelephone 100. Alternatively, the radiotelephone 108 may posses its own SIM, in addition to the virtual SIM 114. A system for transferring SIM information between radiotelephones is described in our European Patent 0 378 450.

Once the radiotelephone 108 has acquired information contained in the SIM of radiotelephone 100, the radiotelephone 100 is made passive so that the radiotelephone 108 can connect to the telecommunications network 116 and become active. The GSM standard does not permit devices having the same SIM to be active on the network, therefore if the SIM of a first device is used by a second device, the first device must be made passive before the second device is made active.

When the second device is made active it must go through the network identification and connection routines, searching for the strongest channel, authentication etc. One major problem with this is the time taken by making the first device passive then making the second device active.

Figure 2:
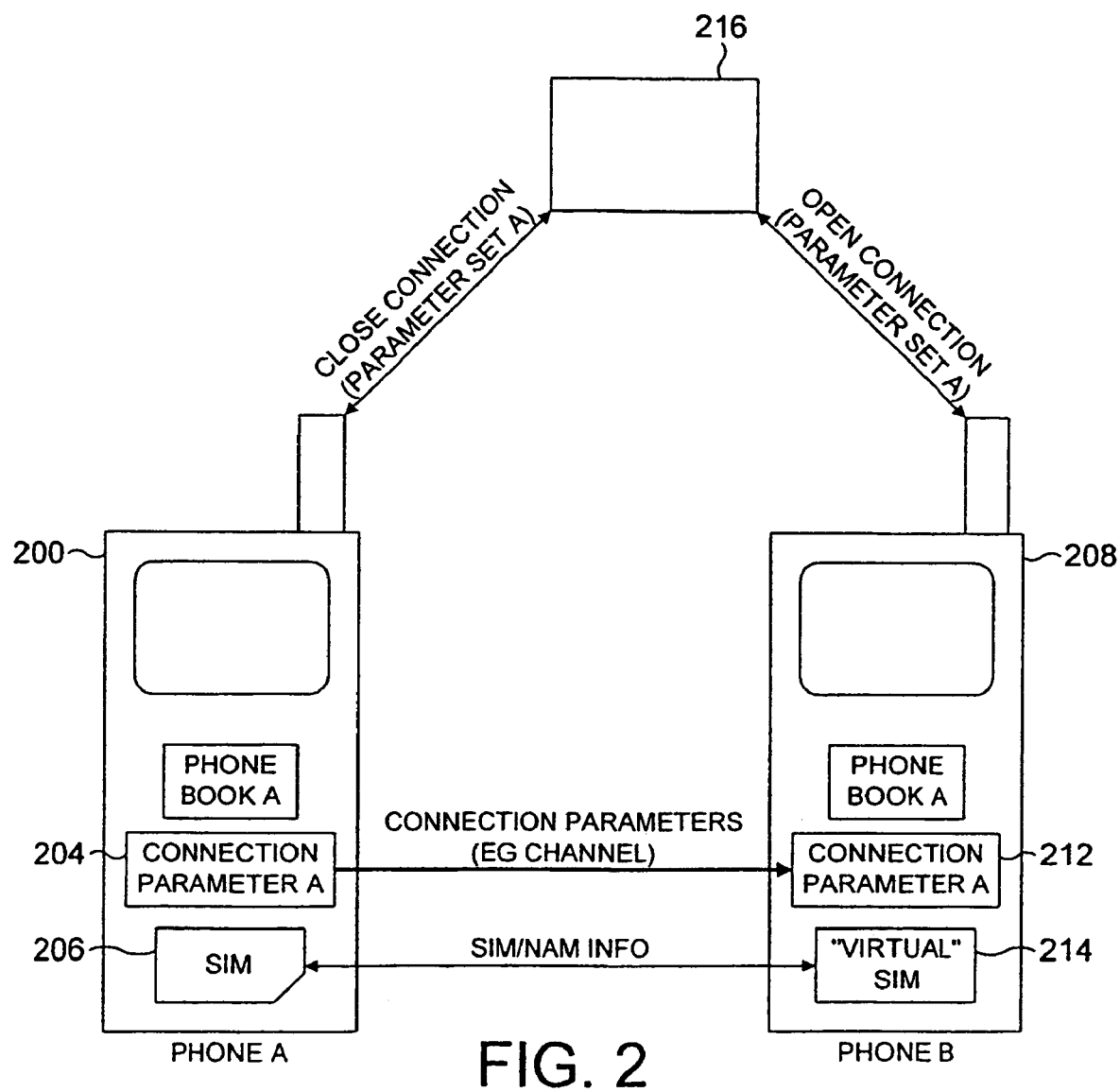
FIG. 2 is a block diagram of a system according to a first embodiment of the present invention.

FIG. 2 is a block diagram of a system according to a first embodiment of the present invention. FIG. 2 is essentially the same as FIG. 1 with the addition of memory 204 in radiotelephone 200 for storing connection parameters, and a memory 212 in radiotelephone 208. The connection parameters stored in memory 204 contain information relating to the current connection to the telecommunications network 216. The connection parameters can include information such as the radio channel in use, frequency bands, GSM channel having the strongest signal strength etc. Those skilled in the art will appreciate that in other communication systems, such as GPRS, CDMA etc, additional parameters could also be included.

When radiotelephone 208 acquires information contained in the SIM of the radiotelephone 200, the radiotelephone 208 additionally acquires the connection parameters stored in the memory 204 of radiotelephone 200. These acquired connection parameters may be stored in the memory 212 of radiotelephone 208.

When the radiotelephone 200 is made passive, as described above, and radiotelephone 208 is made active, the radiotelephone 208 uses the acquired connection parameters to establish a connection with the telecommunications network 216. Since the radiotelephone 208 uses the same connection parameters as used by the radiotelephone 200, connection time to the telecommunications network is greatly reduced, since this removes the need for the radiotelephone 208 to go through the usual channel searching procedures etc.

Figure 2A:
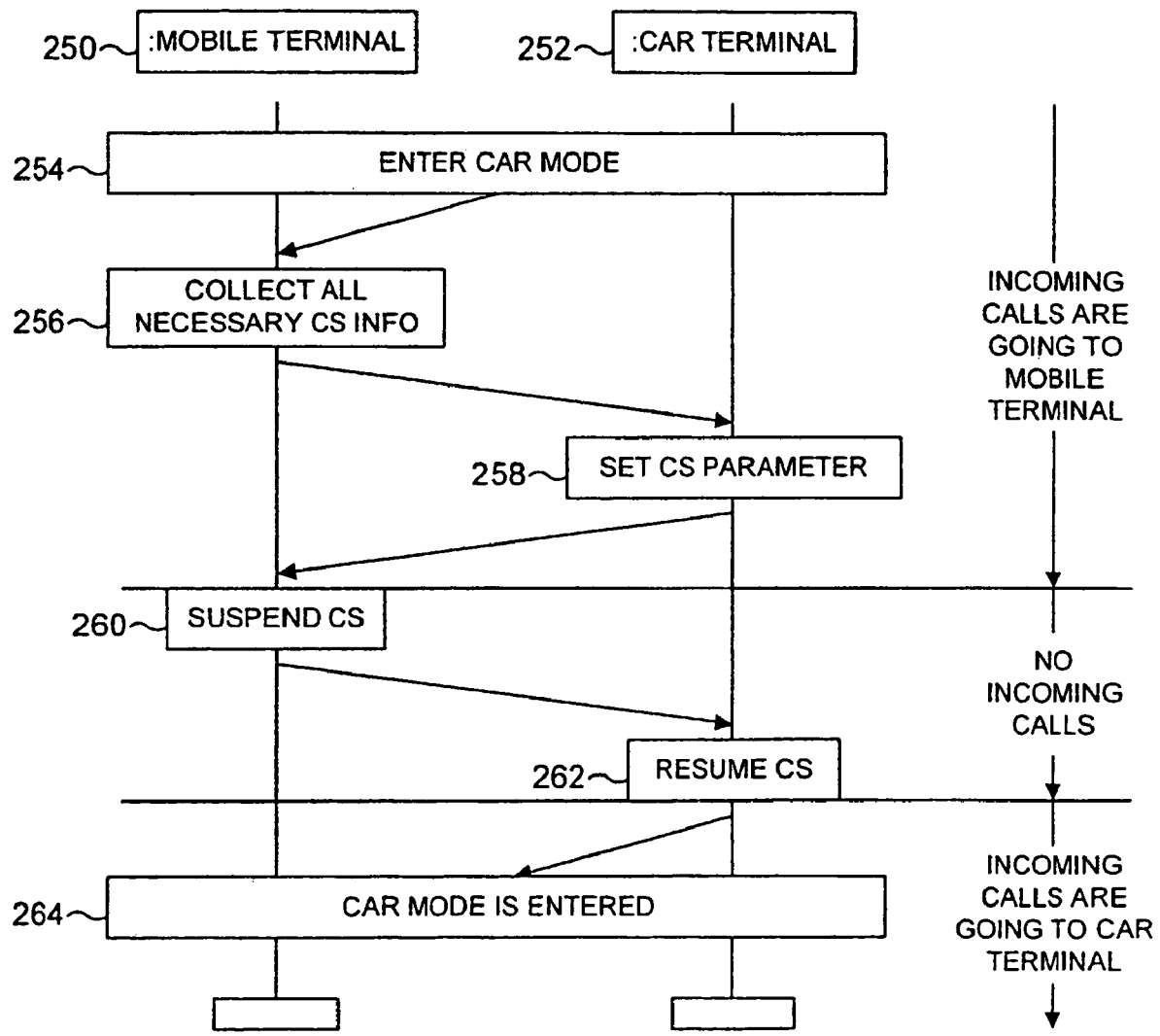
FIG. 2a is an event diagram showing the main events which occur during identity transfer.

FIG. 2a is an event diagram showing the main events which occur during identity transfer. In this example, the first radiotelephone is a mobile telephone 250 and the second radiotelephone is a car terminal 252. When it is desired to transfer from the mobile telephone to the car terminal, the mobile telephone 250 gathers all the necessary cellular system information (256), such as connection parameters. These parameters are transferred to the car terminal 250 in a step 258. During this time all incoming calls will continue to be routed to the mobile telephone 250. The mobile telephone 250 is then suspended (260) and the car terminal 252 resumes operation, using the gathered cellular system information. Once the car terminal has resumed operation, all calls are routed to the car terminal 252. A similar operation can be performed when transferring from car terminal to the mobile telephone.

Figure 3:
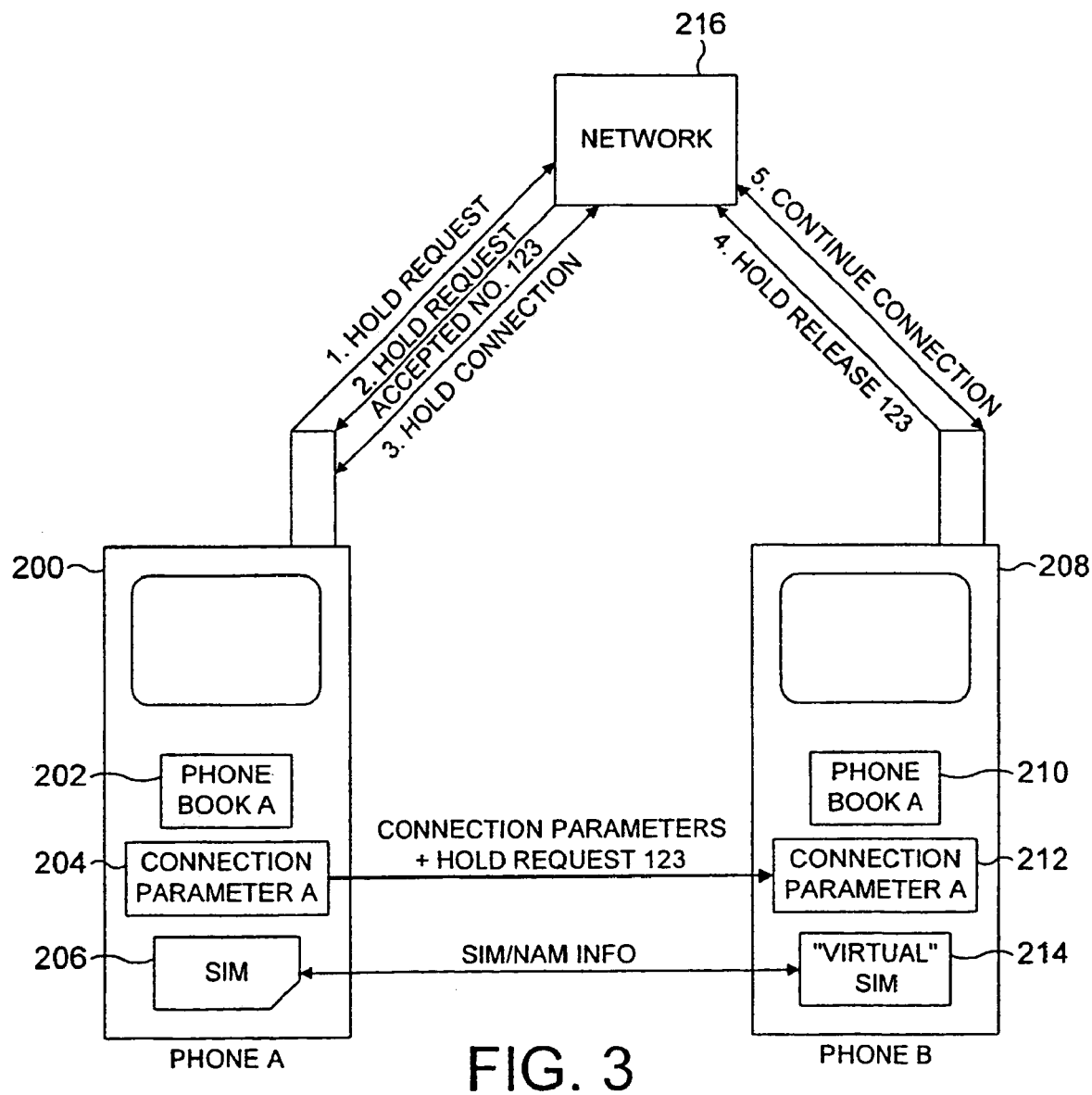
FIG. 3 is a block diagram of a system according to a further embodiment of the present invention.

FIG. 3 is a block diagram of a system according to a further embodiment of the present invention. FIG. 3 shows the same radiotelephones 200 and 208 as shown in FIG. 2, although this embodiment allows the transfer of information contained in the SIM of radiotelephone 200 to radiotelephone 208 during a call. If during a call a user wants to transfer from radiotelephone 200 to radiotelephone 208 either the user or the radiotelephone 200 submits a hold request to the network 216. The network 216, in response to the hold request, puts the current call on hold, and transmits a hold request code to the radiotelephone 200. Once the hold request code is received by the radiotelephone 200 information contained in the SIM can be transferred as previously described. Additionally, the hold request code is also transferred to the radiotelephone 208. Once the radiotelephone 208 has acquired information contained in the SIM of the radiotelephone 200, the radiotelephone submits a hold release request to the network. The hold release request includes the hold request code so that the network is able to correctly identify which call is to be released. Once the call has been released by the network the radiotelephone 208 is able to continue the call.

Those skilled in the art will appreciate that the concepts herein described with reference to SIMs, may also be applied to other identification systems. For example, other radiotelephones may use number assignment modules (NAM) or other devices containing embedded identification information. Furthermore, the present invention is not limited for use with radiotelephones and may be used equally with any similar communications devices.

The above description has not entered into detail regarding the specific way in which the data transfer may effect between two radiotelephones. However, those skilled in the art will appreciate that there are many ways in which such data transfer may be effected including; a low power radio frequency (LPRF) link; a Bluetooth connection; an infra-red connection; a direct wire connection. The mechanisms for deciding when an identity transfer shall take place are also well understood by those skilled in the art, and may be based, for example, on the proximity of two devices, user interaction, detection of direct connection, etc.

The invention claimed is:

1. A communication system comprising first and second radiotelephones configured to communicate with a telecommunications network, the first radiotelephone comprising identification information, the second radiotelephone being configured to acquire at least some of the identification information of the first radiotelephone from the first radiotelephone, wherein the second radiotelephone, when in a passive state in which there is no connection to the telecommunications network, is further configured to acquire connection parameters from the first radiotelephone when the first radio telephone is in an active state in which there is a connection to the telecommunications network, wherein the connection parameters include information relating to any of: the strongest radio channel and radio channels in use, and further configured to re-use the acquired connection parameters when the state of the second radiotelephone has changed from the passive state to an active state by effecting a connection between the second radio telephone and the telecommunications network, avoiding channel searching procedures, wherein the connection parameters are usable by the first radio telephone, when the first radiotelephone is in the active state to effect a connection between the first radio telephone and the telecommunications network before the connection parameters are re-usable by the second radio telephone, when the first radiotelephone is in the passive state and the second radiotelephone is in the active state, to effect a connection between the second radio telephone and the telecommunications network, wherein the first radiotelephone is configured to, prior to the second radiotelephone acquiring information from the first radiotelephone, send a hold request to the telecommunications network enabling the first radiotelephone to change from the active state to a passive state, wherein the first radiotelephone and the second radiotelephone are not simultaneously connected to the telecommunications network using the same identification information.

2. A communications system according to claim 1, wherein the connection parameters provide information relating to the connection of the first radiotelephone to the telecommunications network.

3. A communications system according to claim 1, wherein the second radiotelephone further comprises a memory for storing the acquired connection parameters.

4. The communications system of claim 1, wherein the identification information is contained in a subscriber identification module.

5. The communications system of claim 1, wherein the identification information is contained in a number assignment module.

6. The communications system of claim 1, wherein the first radiotelephone is configured to receive a hold request code from the telecommunications network.

7. The communications system of claim 6, wherein the second radiotelephone is configured to acquire the hold request code.

8. The communications system of claim 7, wherein the second radiotelephone is configured to transmit the acquired hold request code to the network, thereby effecting a connection to the telecommunications network.

9. The communications system of claim 1, configured to be used with a system in accordance with the global system for mobile communications standard.

10. The communications system of claim 1, configured to be used with a system in accordance with the general radio packet services standard.

11. The communications system of claim 1, wherein the acquisition of the parameters is effected over a low power radio frequency connection.

12. The communication system of claim 1, wherein the acquisition of the parameters is effected over a Bluetooth connection.

13. A radiotelephone for use with the communications system of claim 1.

14. The communications system of claim 1, wherein the first radio telephone is connected to the telecommunications network.

15. A method comprising: transferring to a first radiotelephone from a second radiotelephone at least some identification information contained in the second radiotelephone for use in connecting the first radiotelephone to a network; further transferring to the first radiotelephone from the second radiotelephone, when the first radiotelephone is in a passive state in which there is no connection to the telecommunications network, connection parameters stored in the second radiotelephone when the second radiotelephone is in an active state in which there is a connection to the telecommunications network, wherein the connection parameters include information relating to any of: the strongest radio channel; and radio channels in use; re-using the transferred connection parameters to connect the first radiotelephone to the telecommunications network when the state of the first radiotelephone has changed from the passive state to an active state, avoiding channel searching procedures wherein the connection parameters are usable by the second radio telephone when the second radiotelephone is in the active state to effect a connection between the second radio telephone and the telecommunications network before the connection parameters are transferred to the first radio telephone to effect a connection between the first radio telephone and the telecommunications network, further comprising sending from the second radiotelephone, a hold request to the telecommunications network enabling the second radiotelephone to change from the active state to a passive state, wherein the first radiotelephone and the second radiotelephone are not simultaneously connected to the telecommunications network using the same identification information.

16. A method according to claim 15, wherein the connection parameters provide information relating to the connection of the second radiotelephone to the telecommunications network.

17. A method according to claim 15, further comprising storing the transferred connection parameters at the first radiotelephone.

18. A method according to claim 15, further comprising receiving, at the second radiotelephone, a hold request code from the telecommunications network.

19. A method according to claim 18, further comprising acquiring, at the first radiotelephone, the hold request code.

20. A method according to claim 19, further comprising transmitting, from the first radiotelephone, the acquired hold request code to the network, thereby effect a connection to the telecommunications network.

21. A method according to claim 15 for use in accordance with the global system for mobile communications standard.

22. A method according to claim 15 for use in accordance with the general radio packet service standard.

23. A communication system comprising first and second radiotelephones configured to communicate with a telecommunications network, the first radiotelephone comprising identification information, the second radiotelephone being configured to acquire at least some of the identification information of the first radiotelephone from the first radio telephone, while the first radio telephone has a connection to a telecommunications network, defined by connection parameters, wherein the second radiotelephone, when in a passive state in which there is no connection to the telecommunications network is further configured to acquire the connection parameters from the first radiotelephone when the first radiotelephone is in an active state in which there is a connection to the telecommunications network, and re-use the acquired connection parameters when the state of the second radiotelephone has changed from the passive state to an active state by effecting a connection between the second radio telephone and the telecommunications network, wherein the first radiotelephone is configured to, prior to the second radiotelephone acquiring information from the first radiotelephone, send a hold request to the telecommunications network enabling the first radiotelephone to change from the active state to a passive state, wherein the first radiotelephone and the second radiotelephone are not simultaneously connected to the telecommunications network using the same identification information.

24. The communications system of claim 23, wherein the first radio telephone is connected to the telecommunications network.

25. A radio telephone comprising:
means for acquiring at least some identification information contained in another radiotelephone for re-use in connecting the radiotelephone to a telecommunications network; means for when the radiotelephone is in a passive state in which there is no connection to the telecommunications network, further acquiring connection parameters stored in the another radiotelephone when the another radiotelephone is in an active state in which there is a connection to the telecommunications network, wherein the connection parameters are usable by the another radio telephone to effect a connection between the another radio telephone and the telecommunications network, wherein the connection parameters include information relating to any of: the strongest radio channel; and radio channels in use; means for re-using the acquired connection parameters when the state of the radiotelephone has changed from the passive state to an active state by connecting the radiotelephone to the telecommunications network, avoiding channel searching procedures, wherein the another radiotelephone is configured to, prior to the radiotelephone acquiring information from the another radiotelephone, send a hold request to the telecommunications network enabling the another radiotelephone to change from the active state to a passive state, wherein the radiotelephone and the another radiotelephone are not simultaneously connected to the telecommunications network using the same identification information.

26. A radio telephone comprising:
identification information and connection parameters used in connecting the radiotelephone to a telecommunications network, wherein the connection parameters include information relating to any of: the strongest radio channel; and radio channels in use; and means for transferring identification information and further means for transferring connection parameters, when the radiotelephone is in an active state in which there is a connection to the telecommunications network, directly to another radiotelephone when the another radio telephone is in a passive state in which there is no connection to the telecommunications network for re-use in connecting the another radiotelephone to the telecommunications network when the state of the another radiotelephone has changed from the passive state to an active state, wherein the radiotelephone is configured to prior to transferring information to the another radiotelephone, sending a hold request to the telecommunications network enabling the first radiotelephone to change from the active state to a passive state, wherein the first radiotelephone and the second radiotelephone are not simultaneously connected to the telecommunications network using the same identification information.

27. A radio telephone comprising:
a receiver configured to acquire at least some identification information contained in another radiotelephone for re-use in connecting the radiotelephone to a telecommunications network; the receiver further configured, when the radiotelephone is in a passive state in which there is no connection to the telecommunications network, to acquire connection parameters stored in the another radiotelephone when the other radio telephone is in an active state in which there is a connection to the tele-communication network, wherein the connection parameters are usable by the another radio telephone to effect a connection between the another radio telephone and the telecommunications network when the another radiotelephone in the active state, wherein the connection parameters include information relating to any of: the strongest radio channel; and radio channels in use; a transceiver configured to re-use the acquired connection parameters, when the state of the radiotelephone has changed from the passive state to an active state by effecting a connection of the radiotelephone to the network, avoiding channel searching procedures wherein the another radiotelephone is configured to, prior to the receiver acquiring information from the another radiotelephone, send a hold request to the telecommunications network enabling the another radiotelephone to change from the active state to a passive state, wherein the another radiotelephone and the radiotelephone are not simultaneously connected to the telecommunications network using the same identification information.

28. communication system comprising first and second radiotelephones capable of communicating with a telecommunications network, the first radiotelephone comprising identification information, the second radiotelephone comprising means for acquiring at least some of the identification information of the first radiotelephone from the first radiotelephone, wherein the second radiotelephone when in a passive state in which there is no connection to the telecommunications network, further comprises means for acquiring connection parameters from the first radiotelephone when the first radiotelephone is in an active state in which there is a connection to the telecommunications network, wherein the connection parameters include information relating to any of: the strongest radio channel and radio channels in use, and re-using the acquired connection parameters when the state of the second radiotelephone has changed from the passive state to an active state by effecting a connection between the second radiotelephone and the telecommunications network, avoiding channel searching procedures wherein the connection parameters are usable by the first radiotelephone when the first radiotelephone is in the active state, to effect a connection between the first radiotelephone and the telecommunications network before the connection parameters are re-usable by the second radio telephone to effect a connection between the second radiotelephone and the telecommunications network wherein the first radiotelephone comprises means for sending, prior to the second radiotelephone acquiring information from the first radiotelephone, a hold request to the network enabling the first radiotelephone to change from the active state to a passive state, wherein the first radiotelephone and the second radiotelephone are not simultaneously connected to the telecommunications network using the same identification information.

29. A communication system according to claim 28, wherein the second radiotelephone further comprises a memory for storing the acquired connection parameters.

* * * * *